United States Patent
Goldberg et al.

(10) Patent No.: US 9,560,075 B2
(45) Date of Patent: Jan. 31, 2017

(54) COGNITIVE HONEYPOT

(71) Applicant: INTERNATIONAL BUSINESS MACHINES CORPORATION, Armonk, NY (US)

(72) Inventors: Itzhack Goldberg, Hadera (IL); James R. Kozloski, New Fairfield, CT (US); Clifford A. Pickover, Yorktown Heights, NY (US); Neil Sondhi, Budapest (HU); Maja Vukovic, New York, NY (US)

(73) Assignee: International Business Machines Corporation, Armonk, NY (US)

(*) Notice: Subject to any disclaimer, the term of this patent is extended or adjusted under 35 U.S.C. 154(b) by 0 days.

(21) Appl. No.: 14/521,095

(22) Filed: Oct. 22, 2014

(65) Prior Publication Data
US 2016/0119377 A1    Apr. 28, 2016

(51) Int. Cl.
H04L 29/06 (2006.01)
H04L 29/08 (2006.01)
G06F 17/27 (2006.01)
G06F 17/28 (2006.01)

(52) U.S. Cl.
CPC .......... H04L 63/1491 (2013.01); G06F 17/27 (2013.01); G06F 17/28 (2013.01); H04L 63/1408 (2013.01); H04L 67/143 (2013.01)

(58) Field of Classification Search
CPC ....... H04L 63/1491; G06F 17/27; G06F 17/28
See application file for complete search history.

(56) References Cited

U.S. PATENT DOCUMENTS

| 7,383,578 | B2 | 6/2008 | Blake et al. |
| 7,904,958 | B2 | 3/2011 | Lee |
| 7,904,959 | B2 | 3/2011 | Sidiroglou et al. |
| 7,917,593 | B1 * | 3/2011 | Lee ............... G06Q 10/107 709/206 |
| 8,181,250 | B2 | 5/2012 | Rafalovich et al. |
| 8,214,897 | B2 | 7/2012 | Malkin et al. |
| 8,387,122 | B2 | 2/2013 | Toomim et al. |

(Continued)

FOREIGN PATENT DOCUMENTS

WO    2007110093 A1    10/2007

OTHER PUBLICATIONS

Small et al., "To Catch a Predator: A Natural Language Approach for Eliciting Malicious Payloads", 2008, pp. 171-183.*

(Continued)

Primary Examiner — Jason Lee
Assistant Examiner — Thaddeus Plecha
(74) Attorney, Agent, or Firm — Law Office of Jim Boice

(57) ABSTRACT

An electronic communication evaluating device determines a suspicion level for an initial electronic communication. The initial electronic communication is addressed to an addressed entity that is associated with an electronic communication receiver. In response to the suspicion level exceeding a predetermined level, a communication switching device reroutes the initial electronic communication from the addressed entity to a cognitive honeypot. The cognitive honeypot transmits, to the electronic communication transmitting system, emulation electronic communications that emulate the addressed entity until a predefined state of the communication session occurs.

10 Claims, 5 Drawing Sheets

(56) References Cited

U.S. PATENT DOCUMENTS

| | | | |
|---|---|---|---|
| 8,528,091 B2 | 9/2013 | Bowen et al. | |
| 8,689,333 B2 | 4/2014 | Aziz | |
| 8,874,658 B1* | 10/2014 | Khalsa | H04L 51/12 |
| | | | 709/206 |
| 9,055,071 B1* | 6/2015 | Gates | H04L 63/1408 |
| 2003/0145226 A1* | 7/2003 | Bruton, III | H04L 63/1408 |
| | | | 726/22 |
| 2003/0154080 A1* | 8/2003 | Godsey | G10L 19/0018 |
| | | | 704/251 |
| 2004/0078592 A1 | 4/2004 | Fagone et al. | |
| 2004/0172557 A1* | 9/2004 | Nakae | H04L 63/0227 |
| | | | 726/22 |
| 2005/0097364 A1* | 5/2005 | Edeki | G06F 21/31 |
| | | | 726/4 |
| 2005/0166072 A1* | 7/2005 | Converse | H04L 63/1441 |
| | | | 726/5 |
| 2005/0234727 A1* | 10/2005 | Chiu | H04M 3/4936 |
| | | | 704/270.1 |
| 2006/0101516 A1 | 5/2006 | Sudaharan et al. | |
| 2006/0215831 A1* | 9/2006 | Knott | H04M 3/493 |
| | | | 379/211.02 |
| 2007/0101430 A1* | 5/2007 | Raikar | H04L 12/585 |
| | | | 726/24 |
| 2008/0016040 A1* | 1/2008 | Jones | G06F 17/3064 |
| 2009/0287678 A1 | 11/2009 | Brown et al. | |
| 2011/0004649 A1* | 1/2011 | Nord | H04L 67/306 |
| | | | 709/202 |
| 2012/0054823 A1* | 3/2012 | Kim | H04L 63/1458 |
| | | | 726/1 |
| 2012/0151589 A1 | 6/2012 | Hershey et al. | |
| 2012/0167208 A1* | 6/2012 | Buford | H04L 63/1491 |
| | | | 726/22 |
| 2013/0111586 A1* | 5/2013 | Jackson | G06F 11/3438 |
| | | | 726/23 |
| 2013/0145468 A1 | 6/2013 | Martin et al. | |
| 2014/0096229 A1 | 4/2014 | Burns et al. | |
| 2014/0115699 A1 | 4/2014 | Baddour et al. | |
| 2014/0165195 A1* | 6/2014 | Brdiczka | G06F 21/552 |
| | | | 726/23 |
| 2015/0281273 A1* | 10/2015 | Shields | H04L 63/1466 |
| | | | 713/171 |

OTHER PUBLICATIONS

P. Mell et al., "The NIST Definition of Cloud Computing", National Institute of Standards and Technology, Information Technology Laboratory, Special Publication 800-145, Sep. 2011, pp. 1-7.

M. Dacier et al., "Honeypots: Practical Means to Validate Malicious Fault Assumptions", IEEE, PRDC'04, 2004, pp. 1-6.

C. Seifert et al., "Identification of Malicious Web Pages with Static Heuristics", IEEE, ATNAC 2008, pp. 91-96.

A. Greenberg, "How Hackers Hid a Money-Mining Botnet in the Clouds of Amazon and Others", Conde Nast, www.wired.com, Jul. 24, 2014, pp. 1-3.

Anonymous, "Honeypot (computing)", Wikimedia Foundation, Inc, wikipedia.org, retrieved Oct. 22, 2014, pp. 1-4.

\* cited by examiner

COGNITIVE HONEYPOT

BACKGROUND

The present disclosure relates to the field of electronic communications, and specifically to the field of fraudulent electronic communications. Still more specifically, the present disclosure relates to the field of detecting and responding to fraudulent electronic communications.

Electronic communications are communications between two entities, and include, but are not limited to, e-mail, text messages, voice phone calls, etc. While the majority of electronic communications are legitimate, a large portion of electronic communications are for nefarious purposes, such as stealing financial information, fraudulently obtaining money, accessing confidential information, etc.

SUMMARY

A method, hardware device, and/or computer program product manages electronic communications. An electronic communication evaluating device determines a suspicion level for an initial electronic communication. The initial electronic communication is addressed to an addressed entity that is associated with an electronic communication receiver. In response to the suspicion level exceeding a predetermined level, a communication switching device reroutes the initial electronic communication from the addressed entity to a cognitive honeypot. The cognitive honeypot transmits, to the electronic communication transmitting system, emulation electronic communications that emulate the addressed entity until a predefined state of the communication session occurs.

DETAILED DESCRIPTION

Figure 1:
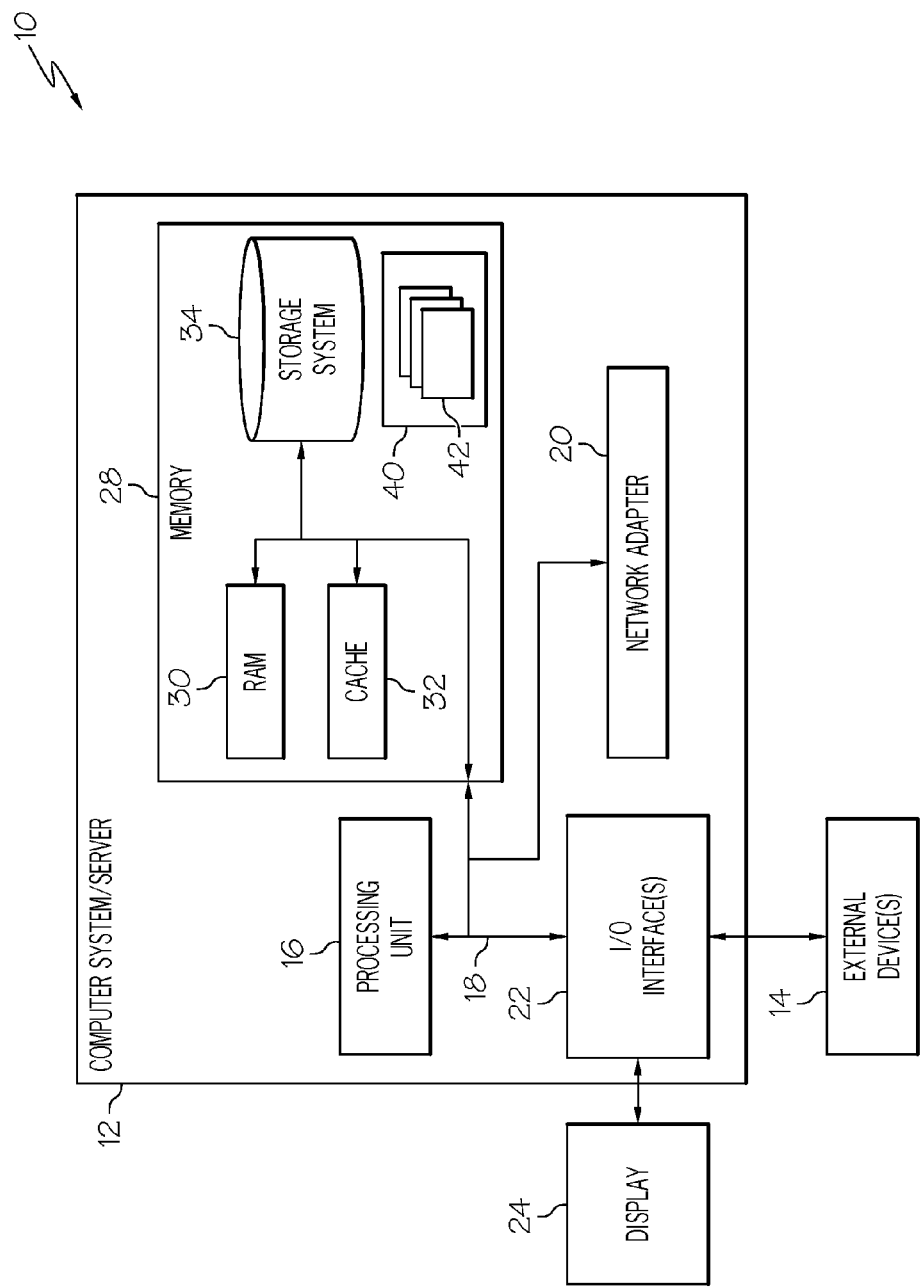
FIG. 1 depicts a cloud computing node according to an embodiment of the present invention.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

In one embodiment, it is to be understood that in one or more embodiments, the present invention is capable of being implemented in a cloud computing environment.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Referring now to FIG. 1, a schematic of an example of a cloud computing node is shown. Cloud computing node 10 is only one example of a suitable cloud computing node and is not intended to suggest any limitation as to the scope of use or functionality of embodiments of the invention described herein. Regardless, cloud computing node 10 is capable of being implemented and/or performing any of the functionality set forth hereinabove.

In cloud computing node 10 there is a computer system/server 12, which is operational with numerous other general purpose or special purpose computing system environments or configurations. Examples of well-known computing systems, environments, and/or configurations that may be suitable for use with computer system/server 12 include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 12 may be described in the general context of computer system-executable instructions, such as program modules, being executed by a computer system. Generally, program modules may include routines, programs, objects, components, logic, data structures, and so on that perform particular tasks or implement particular abstract data types. Computer system/server 12 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 1, computer system/server 12 in cloud computing node 10 is shown in the form of a general-purpose computing device. The components of computer system/server 12 may include, but are not limited to, one or more processors or processing units 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system/server 12 typically includes a variety of computer system readable media. Such media may be any available media that is accessible by computer system/server 12, and it includes both volatile and non-volatile media, removable and non-removable media.

System memory 28 can include computer system readable media in the form of volatile memory, such as random access memory (RAM) 30 and/or cache memory 32. Computer system/server 12 may further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, memory 28 may include at least one program product having a set (e.g., at least one) of program modules that are configured to carry out the functions of embodiments of the invention.

Program/utility 40, having a set (at least one) of program modules 42, may be stored in memory 28 by way of example, and not limitation, as well as an operating system, one or more application programs, other program modules, and program data. Each of the operating system, one or more application programs, other program modules, and program data or some combination thereof, may include an implementation of a networking environment. Program modules 42 generally carry out the functions and/or methodologies of embodiments of the invention as described herein.

Computer system/server 12 may also communicate with one or more external devices 14 such as a keyboard, a pointing device, a display 24, etc.; one or more devices that enable a user to interact with computer system/server 12; and/or any devices (e.g., network card, modem, etc.) that enable computer system/server 12 to communicate with one or more other computing devices. Such communication can occur via I/O interfaces 22. Still yet, computer system/server 12 can communicate with one or more networks such as a local area network (LAN), a general wide area network (WAN), and/or a public network (e.g., the Internet) via network adapter 20. As depicted, network adapter 20 communicates with the other components of computer system/server 12 via bus 18. It should be understood that although not shown, other hardware and/or software components could be used in conjunction with computer system/server 12. Examples, include, but are not limited to: microcode, device drivers, redundant processing units, external disk drive arrays, RAID systems, tape drives, and data archival storage systems, etc.

In one or more embodiments of the present invention, external devices 14 utilize the architecture of the computer system/server 12 shown in FIG. 1. Similarly, the architecture of computer system/server 10 can be implemented in the electronic communication transmitting system 402, the electronic communication receiver 406, the electronic communication evaluating device 408, the communication switching device 410, the addressed entity 412, the natural language processing (NLP) based deep question/answer honeypot 414, the genuine resource 416, the speech interpreting device 420, and/or the human voice emulating device 422 shown in FIG. 4.

Figure 2:
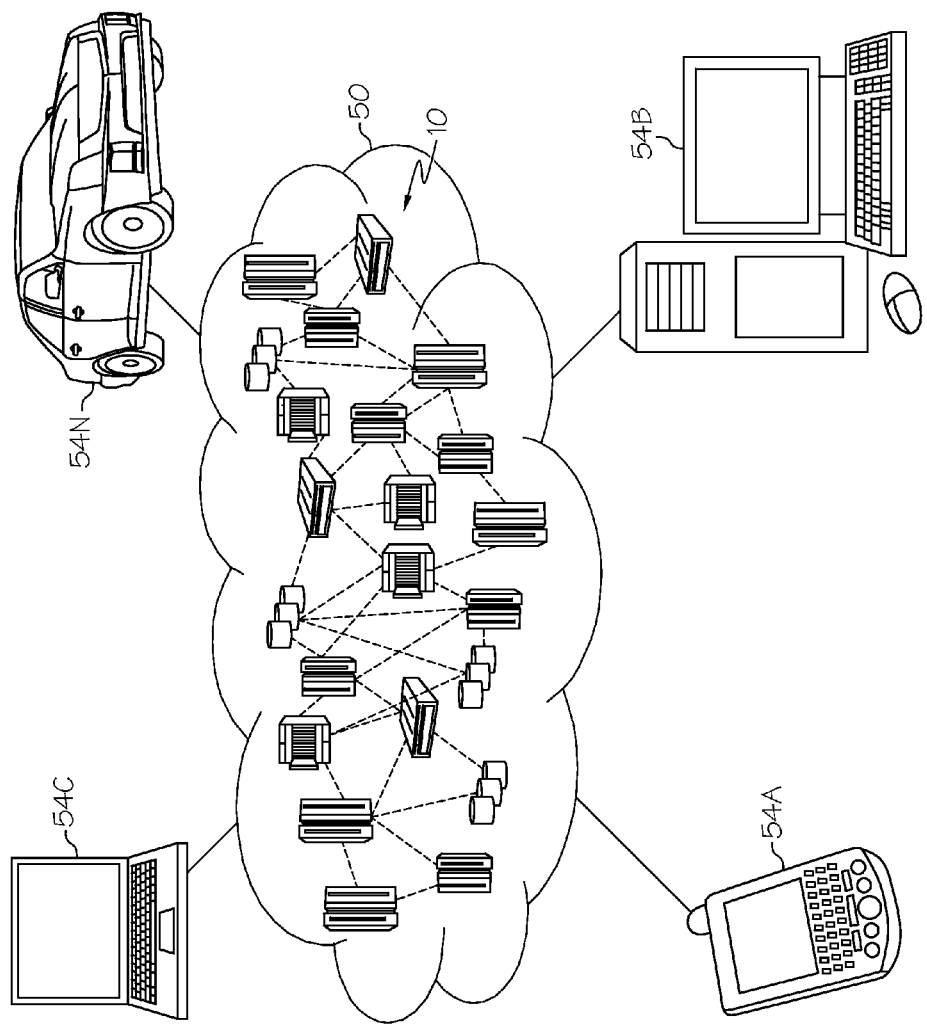
FIG. 2 depicts a cloud computing environment according to an embodiment of the present invention.

Referring now to FIG. 2, illustrative cloud computing environment 50 is depicted. As shown, cloud computing environment 50 comprises one or more cloud computing nodes 10 with which local computing devices used by cloud consumers, such as, for example, personal digital assistant (PDA) or cellular telephone MA, desktop computer MB, laptop computer 54C, and/or automobile computer system MN may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 2 are intended to be illustrative only and that computing nodes 10 and cloud computing environment 50 can communicate with any type of computerized device over any type of network and/or network addressable connection (e.g., using a web browser).

Figure 3:
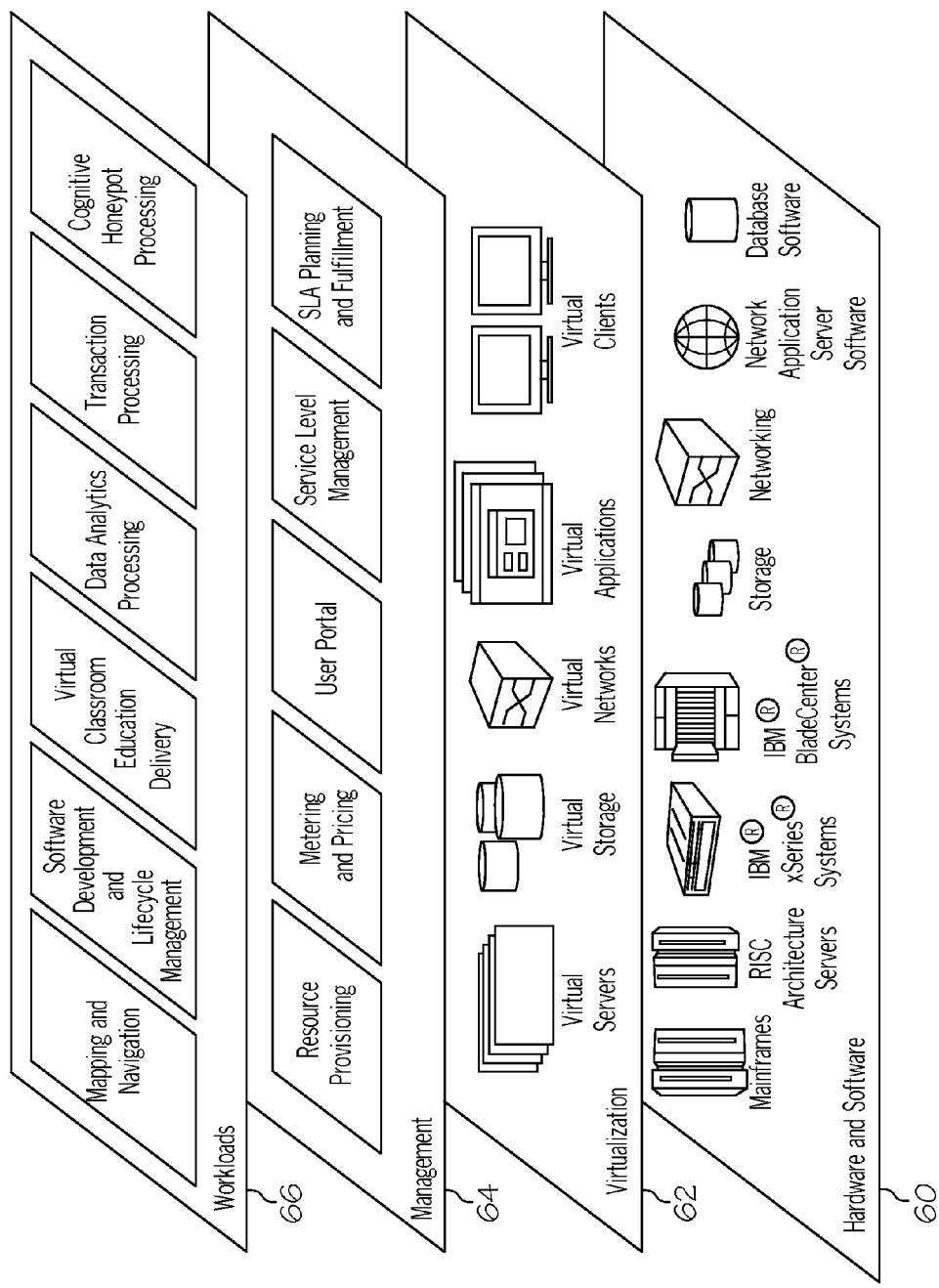
FIG. 3 depicts abstraction model layers according to an embodiment of the present invention.

Referring now to FIG. 3, a set of functional abstraction layers provided by cloud computing environment 50 (FIG. 2) is shown. It should be understood in advance that the components, layers, and functions shown in FIG. 3 are intended to be illustrative only and embodiments of the invention are not limited thereto. As depicted, the following layers and corresponding functions are provided:

Hardware and software layer 60 includes hardware and software components. Examples of hardware components include mainframes, in one example IBM® zSeries® systems; RISC (Reduced Instruction Set Computer) architecture based servers, in one example IBM pSeries® systems; IBM xSeries® systems; IBM BladeCenter® systems; storage devices; networks and networking components. Examples of software components include network application server software, in one example IBM WebSphere® application server software; and database software, in one example IBM DB2® database software. (IBM, zSeries, pSeries, xSeries, BladeCenter, WebSphere, and DB2 are trademarks of International Business Machines Corporation registered in many jurisdictions worldwide)

Virtualization layer 62 provides an abstraction layer from which the following examples of virtual entities may be provided: virtual servers; virtual storage; virtual networks, including virtual private networks; virtual applications and operating systems; and virtual clients.

In one example, management layer 64 may provide the functions described below. Resource provisioning provides dynamic procurement of computing resources and other resources that are utilized to perform tasks within the cloud computing environment. Metering and Pricing provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal provides access to the cloud computing environment for consumers and system administrators. Service level management provides cloud computing resource allocation and management such that required service levels are met. Service Level Agreement (SLA) planning and fulfillment provide pre-arrangement for, and procurement of, cloud computing resources for which a future requirement is anticipated in accordance with an SLA.

Workloads layer 66 provides examples of functionality for which the cloud computing environment may be utilized. Examples of workloads and functions which may be provided from this layer include: mapping and navigation; software development and lifecycle management; virtual classroom education delivery; data analytics processing; transaction processing; and message management through use of cognitive honeypots, as described herein, and as represented by the "Cognitive Honeypot Processing" found in workloads layer 66.

A "honeypot" when used with computer systems is a trap designed to detect and/or counteract the unauthorized use of information technology resources. The honeypot is a false system. First, it is isolated from the real system that the unauthorized user is attempting to access. Second, the resources that it is willing to provide "look like" those of the real information technology resources that are the target of unauthorized use. However, the honeypot resources are either fictional (e.g., do not reveal any real information), or they are only resources that the holder does not need to protect (e.g., publicly available information such as the current time of day). Thus, a honeypot consists of resources such as computers, data, or network sites that appear to be part of a network that is being attacked, and thus appears to contain information or resources that are of value to the attacker, but is actually isolated from the real resources.

A high-interaction honeypot (HIH) is a honeypot that imitates the activities of resources, although these resources are ersatz. The HIH encourages an attacker to spend time responding to requests and other communications from the honeypot, which follows a scripted set of questions, answers, etc., thereby wasting the time and resources of the attacker. However, HIHs are typically easy to overcome in their traditional configuration, due to the static nature of the scripted set of questions, answers, and interactions presented by the honeypot.

Figure 4:
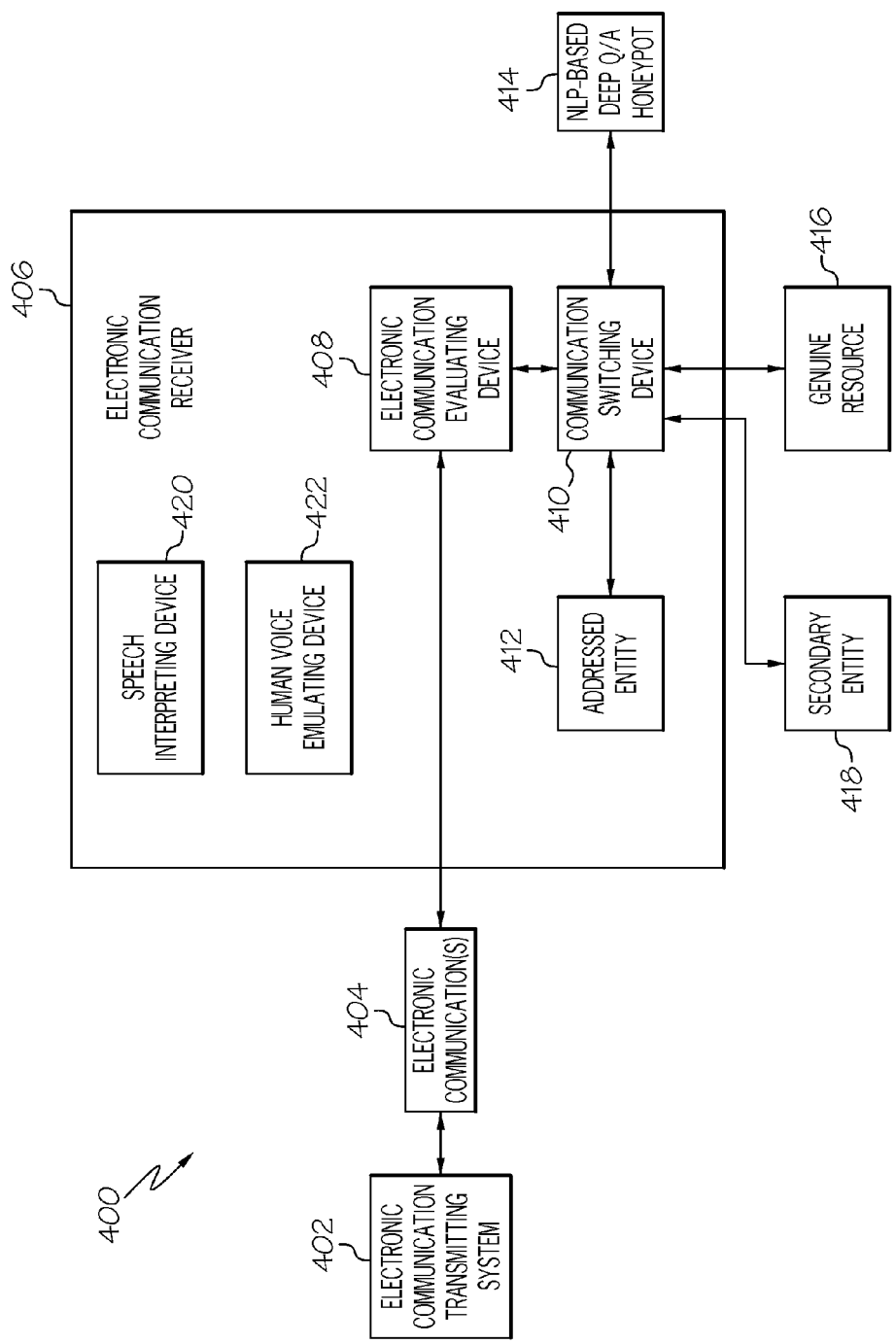
FIG. 4 illustrates an exemplary system in which the present invention may be utilized.

With reference now to FIG. 4, an exemplary system 400 in which the present invention may be utilized is presented. An electronic communication transmitting system 402 is capable of exchanging electronic communication(s) 404 with an electronic communication receiver 406. Examples of such electronic communication(s) 404 include, but are not limited to, e-mail, text messages, instant messages, telephone calls, etc. Such exemplary electronic communication (s) 404 are written/verbal changes of text, either written or spoken, from one person to another. For example, an electronic communication may be an e-mail message or phone call being sent from a user of the electronic communication transmitting system 402 to an addressed entity 412, which is a person who is using the electronic communication receiver 406. In an embodiment of the present invention, the addressed entity 412 is a simulation of a person, such as an avatar. In an embodiment, the addressed entity 412 is an electronic entity, such as a webpage, a portlet, etc.

The electronic communication(s) 404 are initially received by an electronic communication evaluating device 408, which determines a confidence level as to whether an initial electronic communication 404 from the electronic communication transmitting system 402 is legitimate or not. For example, the electronic communication evaluating device 408 may determine, within a predefined level of confidence, that the initial electronic communication 404 is an illegal scam to obtain money, personal information, etc. from the addressed entity 412, or is an attempt to hack into a genuine resource 416, which may be a bank account, corporate records for an enterprise, etc., or is an attempt to log into a restricted network, etc.

Upon determining that the initial electronic communication 404 is legitimate (within the predefined level of confidence), the electronic communication evaluating device 408 instructs a communication switching device 410, which in one or more embodiments is a hardware switch, to direct the initial electronic communication 404 to the addressed entity 412 and/or to the genuine resource 416.

However, upon determining that the initial electronic communication 404 is illegitimate, the electronic communication evaluating device 408 instructs the communication switching device 410 to redirect the initial electronic communication 404 away from the addressed entity 412 and towards a natural language processing (NLP) based deep question/answer honeypot 414.

In an embodiment of the present invention, the NLP-based deep question/answer honeypot 414 is based on a question/answer computing system that utilizes NLP, information retrieval, knowledge representation and reasoning, and machine learning (heuristic) technologies for hypothesizing the nature of electronic communications, gathering data related to the electronic communications, analyzing the gathered data as it relates to the electronic communications, etc. This question/answer computing system utilizes massively parallel processors that are capable of interpreting the subject matter and meaning of an electronic communication, and then retrieve, from millions if not billions of resources, information used to generate a verbal/text response to the electronic communications within a few seconds.

In an embodiment of the present invention, the question/answer computing system parses the electronic communication(s) 404 into different keywords and sentence fragments in order to find statistically related phrases, which are used by language analysis algorithms to retrieve one or more responsive messages to the electronic communication(s) 404 from the electronic communication transmitting system 402.

Figure 5:
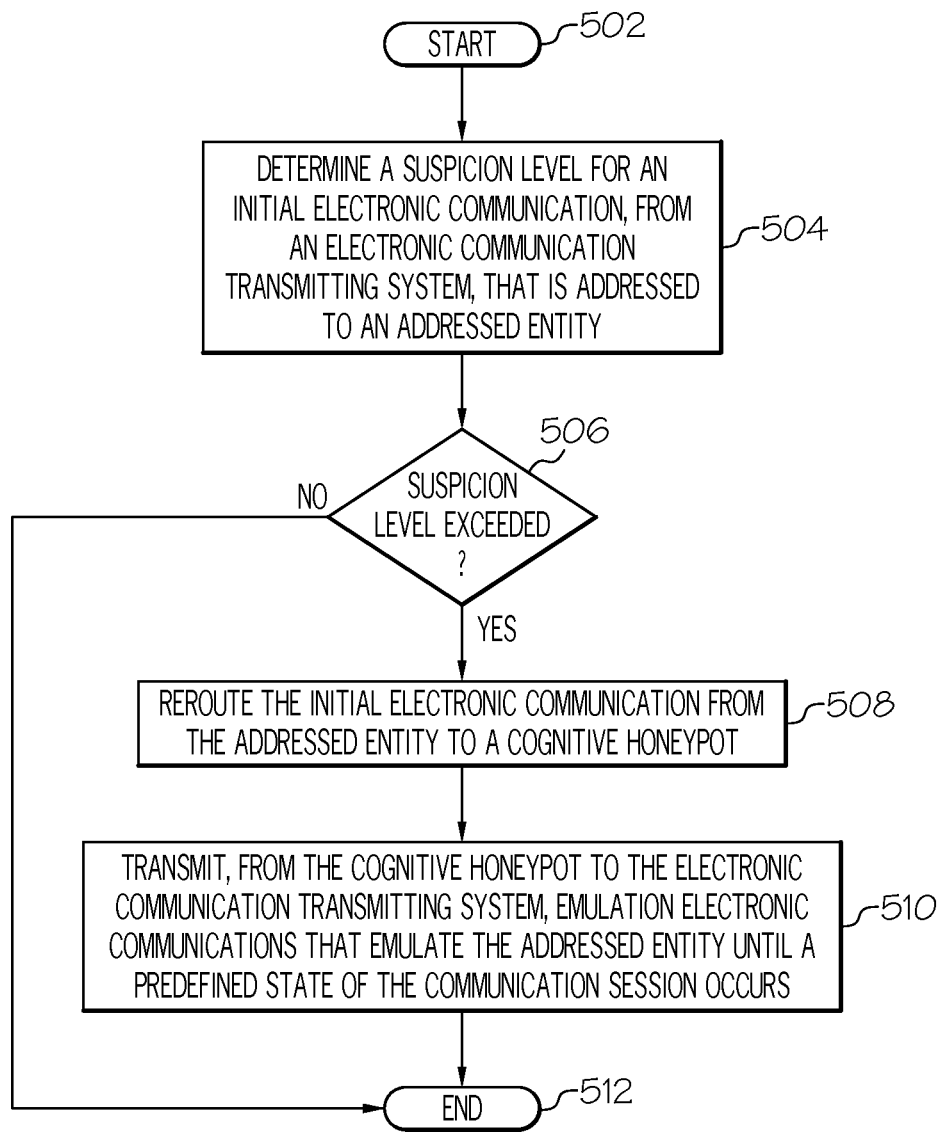
FIG. 5 is a high level flow-chart of one or more operations performed by one or more processors or other hardware devices to manage electronic communications.

With reference now to FIG. 5, a high level flow-chart of one or more operations performed by one or more processors or other hardware devices to manage electronic communications in accordance with one or more embodiments of the present invention is presented.

After initiator block 502, an electronic communication evaluating device (e.g., the electronic communication evaluating device 408 in FIG. 4) determines a suspicion level (i.e., a confidence level as described above) for an initial electronic communication (e.g., one of the electronic communication(s) 404 shown in FIG. 4), as described in block 504. The initial electronic communication is transmitted from an electronic communication transmitting system (e.g., the electronic communication transmitting system 402 in FIG. 4) to an electronic communication receiver (e.g., the electronic communication receiver 406 in FIG. 4) during a communication session between the electronic communication transmitting system and the electronic communication receiver. The initial electronic communication is addressed to an addressed entity (e.g., addressed entity 412 in FIG. 4) that is associated with the electronic communication receiver.

In an embodiment of the present invention, the initial electronic communication is an e-mail to a person. The e-mail may be legitimate or illegitimate. For example, a legitimate e-mail may be an authorized request to obtain personal, financial, or other confidential information from the addressed entity, or it may be an innocuous social exchange. However, an illegitimate e-mail is an e-mail that attempts to obtain personal, financial, or other confidential information from the addressed entity. An exemplary illegitimate e-mail may be for a "419 scam", in which the sender of the e-mail pretends to be a person of considerable wealth and power, who promises a large payout if the recipient of the e-mail agrees to transfer a relatively smaller sum of money to the sender.

The suspicion level describes a level of untrustworthiness with regard to the initial electronic communication. The value of the suspicion level is established using various parameters in various embodiments of the present invention, in order to determine whether the suspicion level exceeds a predetermined level. The existence of one or more parameters, weighted or unweighted, may be summed together to generate a suspicion level having a value, which is then compared to the predetermined level in order to determine if protective/reactive/proactive steps need to be taken. These parameters may be based on one or more factors.

For example, the originating location of the initial electronic communication may be used as a factor in determining whether or not the initial electronic communication is legitimate or not. This originating location may be a geographical region (e.g., a certain country, a certain street address, etc.), and/or the originating location may be an Internet Protocol (IP) address of the electronic communication transmitting system (e.g., electronic communication transmitting system 402 in FIG. 4).

In an embodiment of the present invention, the initial electronic communication is an attempt to obtain access to one or more cloud resources. For example, the initial electronic communication may be an attempt to "sign up" for a podcast, a social media website, free data backup services, etc. In order to ensure that such requests for (free) services are legitimate, the presently described invention is utilized to ensure the authenticity/legitimacy of the sender of the request/initial electronic communication.

In an embodiment of the present invention, the sender of the request/initial electronic communication is a human. In another embodiment of the present invention, however, the request/initial electronic communication is a "robo-call", which is generated by the electronic communication transmitting system 402 executing a program that emulates a human, just as the NLP-based deep Q/A honeypot 414 uses logic that emulates a human. Thus, in this embodiment, two machines (electronic communication transmitting system 402 and electronic communication receiver 406) are "talking" to one another, each exercising their own human emulation logic to "talk" with the other party/entity.

Another factor that is used in one or more embodiments of the present invention for determining whether or not an initial electronic communication is legitimate or not is the existence of a predetermined phrase in the initial electronic communication, as determined by the electronic communication evaluation device (e.g., electronic communication evaluation device 408 in FIG. 4). If the electronic communication evaluation device determines that, due to the existence of the predetermined phrase (and/or its equivalent phrase) in the initial electronic communication (either once or more than some predetermined number of occurrences), then the initial electronic communication may be deemed illegitimate. For example, assume that the electronic communication, either oral (in the case of a phone call) or written (in the case of an e-mail, text message, etc.) includes the phrase "you must send me money". If the e-mail is from a stranger, then this is deemed, by the electronic communication evaluating device 408, to be part of a fraudulent scam. Similarly, if a salutation of the electronic communication (e.g., "Hello my very good friend") is unusual for a particular addressed entity, then this phrase will likely raise the suspicion level.

In an embodiment of the present invention, the suspicion level is calculated by summing up values for all suspicious factors. For example, assume that an initial electronic communication is from an untrusted IP address, is received during the middle of the night (suggesting that it is coming from overseas), and contains the phrase "emergency". Assume further that these factors have been previously weighted (e.g., based on historical data describing nefarious electronic communications), such that the initial electronic communication coming from an untrusted IP address has a weighted value of 5.0, arriving during the middle of the night has a weighted value of 3.5, and containing the phrase "emergency" has a weighted value of 4.0. Summing up these values produces the total suspicion level value of 12.5 (5.0+3.5+4.0). If any electronic communication with a total suspicion level value over 10.0 is deemed to require reactive steps be taken, then this electronic communication would qualify as such.

In an embodiment of the present invention, certain behavior is deemed to automatically place the suspicion level above a predetermined value, such that responsive steps are automatically taken (as described herein). For example, if a hacker attempts to hack into an e-mail account (as clearly demonstrated by the approach used to gain access to the e-mail account), then the honeypot will automatically initiate to imitate the e-mail account, and to exchange communications with the hacker in one or more manners described herein.

In an embodiment of the present invention, rather than determining suspicion levels by summing up factor values, a more complex statistical analysis is used. For example, a Bayesian probability formula can be applied to the problem of determining the suspicion level for the initial electronic communication.

An exemplary Bayesian probability formula used in one or more embodiments of the present invention is:

$$P(A\mid B) = \frac{P(B\mid A)P(A)}{P(B)}$$

where:

P(A|B) is the probability that an initial electronic communication is fraudulent (A) given that (|) the initial electronic communication has a predefined feature (B);

P(B|A) is the probability that the initial electronic communication has the predefined feature (B) given that (|) the initial electronic communication is fraudulent (A);

P(A) is the probability that the initial electronic communication is fraudulent regardless of any other information; and P(B) is the probability that the initial electronic communication has the predefined feature regardless of any other information.

For example, assume that the predefined feature of the initial electronic communication is that it includes the phrase "bank account", and that 5% of all initial electronic communications include the phrase "bank account", thus making P(B)=0.05. Assume further that 20% of all initial electronic communications are fraudulent, thus placing P(A) at 0.20. Furthermore, historical data shows that of the 20% of all initial electronic communications that are fraudulent, 80% of those initial electronic communications include the phrase "bank account", such that P(B|A) is (0.20×0.80)=0.16. Based on these probabilities, then the probability P(A|B) that any particular initial electronic communication is fraudulent (A) given that (|) the initial electronic communication has the predefined feature (B) is 64%:

$$P(A\mid B) = \frac{.16 * .20}{.05} = .64$$

If 64% exceeds some predetermined value (e.g., 50%), then honeypot procedures, using the presently disclosed invention, will be implemented.

Returning now to FIG. 5, a query is made as to whether or not the suspicion level of the initial electronic communications exceeds a predetermined level (query block 506). If so, then a communication switching device reroutes the initial electronic communication from the addressed entity to a cognitive honeypot (block 508).

In an embodiment of the present invention, the cognitive honeypot is a natural language question and answer honeypot device, such as the NLP-based deep question/answer honeypot 414 shown in FIG. 4. This cognitive honeypot has multiple capabilities.

One capability of the cognitive honeypot (e.g., NLP-based deep Q/A honeypot 414) is the ability to "tie up" the electronic communication transmitting system with emulation electronic communications, which are sent to the electronic communication transmitting system, as described in block 510 in FIG. 5. In an embodiment of the present invention, these emulation electronic communications emulate either the addressed entity or another party or a resource being requested by the initial electronic communication.

For example, assume that the electronic communication is addressed to the addressed entity 412 shown in FIG. 4, and asks the addressed entity 412 for his/her bank account number. The NLP-based deep Q/A honeypot 414 will emulate the addressed entity, but will prolong an interchange of information, such as asking appropriate questions of the sender of the initial electronic communication (e.g., "Which of the banks that I use are you interested in?" or "Do you want my checking or savings account?"), thus keeping the sender of the of the initial electronic communication interested. This allows the electronic communication receiver 406 in FIG. 4 to tie up the resources of the electronic communication transmitting system 402, thus slowing it down and perhaps preventing it from attacking other entities.

In an embodiment, the NLP-based deep Q/A honeypot 414 will ask inappropriate (inane) questions of the sender of the initial electronic communication, such as "Who is your favorite movie star?" After several such non sequitur responses, the nefarious sender of the initial electronic communication will give up and move on to another target.

Another capability of the NLP-based deep Q/A honeypot 414 is the ability to gather forensic evidence about the attacker. That is, by asking certain questions of the attacker, a profile of the attacker and/or the equipment being used by the attacker (e.g., electronic communication transmitting system 402 shown in FIG. 4) and/or the writing style and/or the type of inquiries being made can be identified. This allows the electronic communication receiver 406 in FIG. 4 to collect forensic data (e.g., IP addresses, physical locations, language trends, etc.) from the sender of the initial electronic communication. This information can then be used to warn other users of the type of attack that is occurring, and/or to take other corrective steps to protect the resources of the presently-attacked entity.

The flow chart of FIG. 5 thus ends at terminator block 512.

As described in block 510 of FIG. 5, the cognitive honeypot will send emulation electronic communications back to the sender of the initial electronic communication, either of its own volition or in response to follow-up electronic communications from the sender of the initial electronic communication, until a predefined state of the communication session occurs. In an embodiment of the present invention, this predefined state is reduction of the suspicion level to a level that is at or below the predetermined level. That is, in some circumstances, the initial communication is determined to actually be legitimate, based on the exchange of electronic communications between the sender of the initial electronic communication and the cognitive honeypot. Once the electronic communication evaluation device 408 in FIG. 4 becomes convinced that the sender and his/her messages/requests are legitimate, then the communication switching device 410 will route future electronic messages from the sender of the initial electronic communication to the addressed entity 412 and/or a genuine resource 416 (assuming that the genuine resource 416 is requested/needed by the sender of the initial electronic communication).

However, in an embodiment of the present invention, the electronic communication evaluating device 408 continues to mistrust the sender of the initial electronic communication, and will terminate the communication session between the electronic communication transmitting system 402 and the electronic communication receiver 406.

In an embodiment of the present invention, the electronic communication receiver receives responsive electronic communications from the electronic communication transmitting system. These responsive electronic communications are in response to the emulation electronic communications. For example, an emulation electronic communication from the cognitive honeypot may be "What is your name?", to which a responsive electronic communication from the electronic communication transmitting system may be "My name is Mr. Smith." Eventually, the user of the electronic communication transmitting system, or logic within the electronic communication transmitting system, will decide that he/she/it has wasted enough time with this target. At that point, no more responsive electronic communications are sent from the electronic communication transmitting system. Thus, in response to receiving no additional responsive electronic communications after a predetermined amount of time, the communication session between the electronic communication transmitting system and the electronic communication receiver is terminated by the electronic communication receiver (e.g., by the communication switching device 410 in FIG. 4 disconnecting the electronic communication receiver 406 from the electronic communication transmitting system 402).

In an embodiment of the present invention, the electronic communication receiver receives responsive electronic communications from the electronic communication transmitting system. As discussed herein, these responsive electronic communications are responses to the emulation electronic communications. The electronic communication evaluation device subsequently determines that the suspicion level for the initial electronic communication has dropped below the predetermined level, so that the electronic communication evaluation device now trusts the electronic communication transmitting system and/or its user. One or more processors (e.g., the processing unit 16 shown in FIG. 1, which may be utilized by the electronic communication receiver 406 in FIG. 4 or a management computer (not shown), then utilize the responsive electronic communications from the electronic communication transmitting system to identify a new entity that is better suited to handle the initial electronic communication than the addressed entity. The communication switching device then reroutes the subsequent electronic communications from the electronic communication transmitting system to the new entity. For example, assume that the original target of the initial electronic communication was the addressed entity 412 shown in FIG. 4. However, the exchange of responsive electronic communications from the electronic communication transmitting system 402 now suggests to the electronic communication evaluation device 408 to determine that the messages should actually be sent to another party, such as the secondary entity 418 shown in FIG. 4. The secondary entity 418 is deemed by the electronic communication evaluation device 408 to be better suited to handling electronic communications from the electronic communication transmitting system 402, based on personal knowledge held by the secondary entity 418, interests held by the secondary entity 418, time availability of the secondary entity 418, etc. as compared to the addressed entity 412.

In an embodiment of the present invention, the electronic communication evaluation device subsequently determines that the suspicion level for the initial electronic communication has dropped below the predetermined level, so that the electronic communication evaluation device now trusts the electronic communication transmitting system and/or its user. The communication switching device 410 how routes future electronic communications from the electronic communication transmitting system 402 to the addressed entity 412, which was identified in the initial electronic communication.

In an embodiment of the present invention, the electronic communication receiver receives responsive electronic communications, from the electronic communication transmitting system, which are in response to the emulation electronic communications. Hardware processors then utilize the responsive electronic communications from the electronic communication transmitting system to modify the cognitive honeypot from emulating a first type of resource to emulating a second type of resource. For example, assume that the NLP-based deep question/answer honeypot 414 shown in FIG. 4 initially emulates an inventory system. However, based on the exchanges of emulation electronic communications and responsive electronic communications between the NLP-based deep question/answer honeypot 414 and the electronic communication transmitting system 402, the electronic communication evaluation device 408 determines that the electronic communication transmitting system 402 and/or its user would be more interested in banking records. The electronic communication evaluation device 408 thus sends a signal to the NLP-based deep question/answer honeypot 414 to reconfigure itself to look like a system that maintains banking records, thus providing a more attractive honeypot to the electronic communication transmitting system 402 and/or its user.

In an embodiment of the present invention, the electronic communication receiver receives responsive electronic communications, from the electronic communication transmitting system, which are in response to the emulation electronic communications. Hardware processors then utilize the responsive electronic communications from the electronic communication transmitting system to modify a communication style of the cognitive honeypot. For example, assume that the electronic communication evaluating device 408 determines that electronic communications with the electronic communication transmitting system 402 include phrases, idioms, syntax, etc. that are typical of a particular geographic region. In order to better establish a rapport with the sender of the electronic communications, the cognitive honeypot is modified to use similar phrases, idioms, syntax, etc. that are typical of that particular geographic region, in order to give the sender a sense of commonality with the addressed entity 412.

In an embodiment of the present invention, the electronic communication receiver receives responsive electronic communications, from the electronic communication transmitting system, which are in response to the emulation electronic communications. Hardware processors then utilize the responsive electronic communications from the electronic communication transmitting system to determine traits of the electronic communication transmitting system based on the responsive electronic communications from the electronic communication transmitting system. For example, assume that exchanges of emulation electronic communications and responsive electronic communications between the NLP-based deep question/answer honeypot 414 and the electronic communication transmitting system 402 provide forensic evidence that the electronic communication transmitting system 402 is a cloud-based system that operates in Country X. This forensic evidence can then be used to identify the type of electronic communication transmitting system being used, in order to develop appropriate warnings to other users and/or to create appropriate counter-measures.

In an embodiment of the present invention, the electronic communication receiver receives responsive electronic communications, from the electronic communication transmitting system, which are in response to the emulation electronic communications. Hardware processors then utilize the responsive electronic communications from the electronic communication transmitting system to determine traits of an author of the responsive electronic communications from the electronic communication transmitting system. For example, if the responsive electronic communications use certain idiomatic expressions that are specific for a particular country/region, then it is likely that the author of the responsive electronic communications from the electronic communication transmitting system is from that country/region. Similarly, if the subsequent responsive electronic communications use language that becomes progressively more and more terse, then a level of patience with and/or perseverance in using the honeypot can be identified, thus affording better countermeasures to the system.

In an embodiment of the present invention, the initial electronic communication is a telephone call to a first person, and the electronic communication receiver has a speech interpreting device 420 and a human voice emulating device 422, as depicted in FIG. 4. The speech interpreting device 420 is able to determine the subject (i.e., topic) of the telephone call. If the electronic communication evaluation device 408 determines that the subject of the telephone call raises the suspicion level over the predetermined level, then the communication switching device 410 will reroute the telephone call to the human voice emulating device 422, which mimics a voice of a second person using content derived from the cognitive honeypot. For example, assume that the phone call is to a first person. However, either the first person to whom the call was made, or the electronic communication evaluation device 408, recognizes that the initial electronic communication is suspicious. The phone call is then re-routed to the human voice emulating device, which generates voice signals that mimic the voice of the second person, thus creating a honeypot phone conversation between the person placing the phone call and the human voice emulating device. That is, the person who placed the nefarious call is tricked into thinking that he/she has been switched to another party.

In an embodiment of the present invention, the initial electronic communication is a telephone call to a person, and the electronic communication receiver has a speech interpreting device 420 and a human voice emulating device 422, as depicted in FIG. 4. The speech interpreting device 420 is able to determine the subject (i.e., topic) of the telephone call. If the electronic communication evaluation device 408 determines that the subject of the telephone call raises the suspicion level over the predetermined level, then the communication switching device 408 will reroute the telephone call to the human voice emulating device 422, which mimics a voice of the person using content derived from the cognitive honeypot. That is, rather than tricking the person who placed the nefarious call into thinking that he/she has been switched to another party, he/she is tricked into thinking that he/she is still talking to the person that he/she called.

In an embodiment of the present invention, one or more processors determine a level of data storage device usage by the electronic communication transmitting system during a predefined past period of time. The electronic communication evaluating device then determines the suspicion level based on the level of data storage device usage by the electronic communication transmitting system during the predefined past period of time. For example, assume that the electronic communication receiver 406 determines that the electronic communication transmitting system 402 shown in FIG. 4 has been using an excessively high amount of cloud storage (i.e., beyond some predefined limit, such as 1,000 terabytes). This may be indicative of phishing or other nefarious activity, thus raising the suspicion level regarding the appropriateness of the electronic communications coming from the electronic communication transmitting system 402.

In an embodiment of the present invention, the electronic communication evaluating device determines a level of cloud resources usage by the electronic communication transmitting system during a predefined past period of time, and then determines and/or adjusts the suspicion level based on the level of cloud resources usage by the electronic communication transmitting system during the predefined past period of time. For example, if the electronic communication transmitting system 402 in FIG. 4 has been using an excessive amount of cloud resources, including storage devices, processors, virtual machines, applications, etc. (i.e., beyond some predefined limit), then this is indicative of illicit and/or improper activities, thus causing the suspicion level for the electronic communication transmitting system 402 and/or its user to be raised.

In an embodiment of the present invention, the electronic communication evaluating device identifies an age of a password used to encrypt the initial electronic communication. The electronic communication evaluating device then sets the suspicion level based on the age of the password. For example, if the password is "stale" (e.g., was created more than a year ago and/or has not been used at all within the past three months), this raises doubts as to the legitimacy of electronic communications that use this password.

In an embodiment of the present invention, the electronic communication evaluating device adjusts a time delay for transmitting the emulation electronic communications based on the suspicion level. For example, if the electronic communication evaluating device determines that the electronic communication transmitting system 402 and/or its user are highly suspicious, then any responsive communications (e.g., emulation electronic communications discussed above) will be delayed to the point that the electronic communication transmitting system 402 and/or its user will lose patience, and discontinue the attack on the electronic communication receiver 406.

In an embodiment of the present invention, the genuine resource 416 shown in FIG. 4 is a legitimate resource that is available to the addressed entity. In this embodiment, in response to the suspicion level dropping to or below the predetermined level, the communication switching device will reroute the initial electronic communication from the cognitive honeypot to the genuine resource. That is, if the electronic communication evaluating device 408 determines that the electronic communication transmitting system 402 and/or its user are legitimate, then the communication switching device 410 will allow the electronic communication transmitting system 402 and/or its user to access the genuine resource 416.

As described herein and in various embodiments, the present invention presents an NLP-based deep question/answer honeypot 414 that can be used to catch potentially malicious users and behaviors associated with computer system usage. Disclosed herein are a system, method, and service that include an intelligent Q&A (question & answering) system with NLP (natural language processing) for detecting risky behavior (e.g. attempt at phishing, spam, security break-in) with confidence defined by a suspicion level. Based on a determination that a risky behavior has been detected, the system triggers a Q&A spam/phishing scam engagement element (EE), such as electronic communications between the NLP-based deep question/answer honeypot 414 and the electronic communication transmitting system 402 as described herein. The engagement element (EE) response is via email, on-line-chat, instant messaging, etc. The level of suspicion is dynamically adjustable upward or downward, as described herein.

The terminology used herein is for the purpose of describing particular embodiments only and is not intended to be limiting of the present invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of various embodiments of the present invention has been presented for purposes of illustration and description, but is not intended to be exhaustive or limited to the present invention in the form disclosed. Many modifications and variations will be apparent to those of ordinary skill in the art without departing from the scope and spirit of the present invention. The embodiment was chosen and described in order to best explain the principles of the present invention and the practical application, and to enable others of ordinary skill in the art to understand the present invention for various embodiments with various modifications as are suited to the particular use contemplated.

Any methods described in the present disclosure may be implemented through the use of a VHDL (VHSIC Hardware Description Language) program and a VHDL chip. VHDL is an exemplary design-entry language for Field Programmable Gate Arrays (FPGAs), Application Specific Integrated Circuits (ASICs), and other similar electronic devices. Thus, any software-implemented method described herein may be emulated by a hardware-based VHDL program, which is then applied to a VHDL chip, such as a FPGA.

Having thus described embodiments of the present invention of the present application in detail and by reference to illustrative embodiments thereof, it will be apparent that modifications and variations are possible without departing from the scope of the present invention defined in the appended claims.

What is claimed is:

1. A method for managing electronic communications, the method comprising:
    determining, by an electronic communication evaluating device, a suspicion level for an initial electronic communication, wherein the initial electronic communication is addressed to an addressed entity that is associated with an electronic communication receiver;
    in response to the suspicion level exceeding a predetermined level, rerouting, by a communication switching device, the initial electronic communication from the addressed entity to a cognitive honeypot, wherein the cognitive honeypot is a natural language question and answer honeypot communication device that determines a legitimacy of the initial electronic communication;
    transmitting, from the cognitive honeypot to an electronic communication transmitting system, emulation electronic communications that emulate the addressed entity until a predefined state of a communication session occurs;
    receiving, by the electronic communication receiver, responsive electronic communications from the electronic communication transmitting system, wherein the responsive electronic communications are in response to the emulation electronic communications;
    in response to receiving no additional responsive electronic communications after a predetermined amount of time, terminating the communication session between the electronic communication transmitting system and the electronic communication receiver;
    determining, by an electronic communication evaluating device, that the suspicion level for the initial electronic communication has dropped below the predetermined level;
    utilizing the responsive electronic communications from the electronic communication transmitting system to identify a new entity that is better suited to handle the initial electronic communication than the addressed entity;
    rerouting, by a communication switching device, subsequent electronic communications from the electronic communication transmitting system to the new entity;
    utilizing the responsive electronic communications from the electronic communication transmitting system to modify the cognitive honeypot from emulating a first type of resource to emulating a second type of resource;
    utilizing the responsive electronic communications from the electronic communication transmitting system to modify a communication style of the cognitive honeypot, wherein a modified communication style emulates a communication style of the responsive electronic communications;
    examining the initial electronic communication for a predetermined phrase;
    determining the suspicion level based on identifying the predetermined phrase in the initial electronic communication;
    determining a level of data storage device usage by the electronic communication transmitting system during a predefined past period of time;
    determining, by the electronic communication evaluating device, the suspicion level based on the level of data storage device usage by the electronic communication transmitting system during the predefined past period of time;

determining, by the electronic communication evaluating device, a level of cloud resources usage by the electronic communication transmitting system during the predefined past period of time;

determining, by the electronic communication evaluating device, the suspicion level based on the level of cloud resources usage by the electronic communication transmitting system during the predefined past period of time; and adjusting, by the electronic communication evaluating device, a time delay for transmitting the emulation electronic communications based on the suspicion level.

2. The method of claim 1, wherein the predefined state is a reduction of the suspicion level to a level that is at or below the predetermined level of the suspicion level.

3. The method of claim 1, wherein the predefined state is a termination of the communication session.

4. The method of claim 1, further comprising:
determining, by one or more processors, traits of the electronic communication transmitting system based on the responsive electronic communications from the electronic communication transmitting system.

5. The method of claim 1, further comprising:
determining, by one or more processors, traits of an author of the responsive electronic communications from the electronic communication transmitting system.

6. The method of claim 1, wherein the initial electronic communication is a telephone call from a caller to a first person, wherein the electronic communication receiver comprises a speech interpreting device and a human voice emulating device that mimics a voice of the first person, and wherein the method further comprises:
determining, by the speech interpreting device, a subject of the telephone call;
determining, by the electronic communication evaluating device, that the subject of the telephone call raises the suspicion level over the predetermined level; and
rerouting, by the communication switching device, the telephone call to the human voice emulating device that utilizes content derived by the cognitive honeypot to mimic a voice of a second person for future voice exchanges with the electronic communication transmitting system, wherein the voice of the first person and the voice of the second person sound different such that the caller is given an impression that he/she has been switched to another party.

7. The method of claim 1, wherein the initial electronic communication is a telephone call to a person, wherein the electronic communication receiver comprises a speech interpreting device and a human voice emulating device, and wherein the method further comprises:
determining, by the speech interpreting device, a subject of the telephone call;
determining, by the electronic communication evaluating device, that the subject of the telephone call raises the suspicion level over the predetermined level; and
rerouting, by the communication switching device, the telephone call to the human voice emulating device that mimics a voice of the person using content derived from the cognitive honeypot.

8. The method of claim 1, wherein a genuine resource is a legitimate resource that is available to the addressed entity, and wherein the method further comprises:
in response to the suspicion level dropping to or below the predetermined level, rerouting, by the communication switching device, the initial electronic communication from the cognitive honeypot to the genuine resource.

9. A computer program product for managing electronic communications, the computer program product comprising a computer readable storage medium having program code embodied therewith, wherein the computer readable storage medium is not a transitory signal per se, and wherein the program code is readable and executable by a processor to perform a method comprising:
determining a suspicion level for an initial electronic communication, wherein the initial electronic communication is addressed to an addressed entity that is associated with an electronic communication receiver;
in response to the suspicion level exceeding a predetermined level, rerouting the initial electronic communication from the addressed entity to a cognitive honeypot, wherein the cognitive honeypot is a natural language question and answer honeypot communication device that determines a legitimacy of the initial electronic communication;
transmitting, from the cognitive honeypot to an electronic communication transmitting system, emulation electronic communications that emulate the addressed entity until a predefined state of a communication session occurs;
receiving, by the electronic communication receiver, responsive electronic communications from the electronic communication transmitting system, wherein the responsive electronic communications are in response to the emulation electronic communications;
in response to receiving no additional responsive electronic communications after a predetermined amount of time, terminating the communication session between the electronic communication transmitting system and the electronic communication receiver;
determining, by an electronic communication evaluating device, that the suspicion level for the initial electronic communication has dropped below the predetermined level;
utilizing the responsive electronic communications from the electronic communication transmitting system to identify a new entity that is better suited to handle the initial electronic communication than the addressed entity;
rerouting, by a communication switching device, subsequent electronic communications from the electronic communication transmitting system to the new entity;
utilizing the responsive electronic communications from the electronic communication transmitting system to modify the cognitive honeypot from emulating a first type of resource to emulating a second type of resource;
utilizing the responsive electronic communications from the electronic communication transmitting system to modify a communication style of the cognitive honeypot, wherein a modified communication style emulates a communication style of the responsive electronic communications;
examining the initial electronic communication for a predetermined phrase;
determining the suspicion level based on identifying the predetermined phrase in the initial electronic communication;

determining a level of data storage device usage by the electronic communication transmitting system during a predefined past period of time;

determining, by the electronic communication evaluating device, the suspicion level based on the level of data storage device usage by the electronic communication transmitting system during the predefined past period of time;

determining, by the electronic communication evaluating device, a level of cloud resources usage by the electronic communication transmitting system during the predefined past period of time;

determining, by the electronic communication evaluating device, the suspicion level based on the level of cloud resources usage by the electronic communication transmitting system during the predefined past period of time; and adjusting, by the electronic communication evaluating device, a time delay for transmitting the emulation electronic communications based on the suspicion level.

10. A computer system comprising one or more processors, one or more computer readable memories, and one or more computer readable storage mediums, and program instructions stored on at least one of the one or more storage mediums for execution by at least one of the one or more processors via at least one of the one or more memories, the stored program instructions configured to:

determine a suspicion level for an initial electronic communication, wherein the initial electronic communication is addressed to an addressed entity that is associated with an electronic communication receiver;

in response to the suspicion level exceeding a predetermined level, reroute the initial electronic communication from the addressed entity to a cognitive honeypot, wherein the cognitive honeypot is a natural language question and answer honeypot communication device that determines a legitimacy of the initial electronic communication;

transmit, from the cognitive honeypot to an electronic communication transmitting system, emulation electronic communications that emulate the addressed entity until a predefined state of a communication session occurs;

receive responsive electronic communications from the electronic communication transmitting system, wherein the responsive electronic communications are in response to the emulation electronic communications;

in response to receiving no additional responsive electronic communications after a predetermined amount of time, terminate the communication session between the electronic communication transmitting system and the electronic communication receiver;

determine that the suspicion level for the initial electronic communication has dropped below the predetermined level;

utilize the responsive electronic communications from the electronic communication transmitting system to identify a new entity that is better suited to handle the initial electronic communication than the addressed entity;

reroute subsequent electronic communications from the electronic communication transmitting system to the new entity;

utilize the responsive electronic communications from the electronic communication transmitting system to modify the cognitive honeypot from emulating a first type of resource to emulating a second type of resource;

utilize the responsive electronic communications from the electronic communication transmitting system to modify a communication style of the cognitive honeypot, wherein a modified communication style emulates a communication style of the responsive electronic communications;

examine the initial electronic communication for a predetermined phrase;

determine the suspicion level based on identifying the predetermined phrase in the initial electronic communication;

determine a level of data storage device usage by the electronic communication transmitting system during a predefined past period of time;

determine the suspicion level based on the level of data storage device usage by the electronic communication transmitting system during the predefined past period of time;

determine a level of cloud resources usage by the electronic communication transmitting system during the predefined past period of time;

determine the suspicion level based on the level of cloud resources usage by the electronic communication transmitting system during the predefined past period of time; and adjust a time delay for transmitting the emulation electronic communications based on the suspicion level.

* * * * *